(12) United States Patent
Cherukupalli et al.

(10) Patent No.: US 12,334,863 B2
(45) Date of Patent: Jun. 17, 2025

(54) TRACKING SYSTEMS FOR ADJUSTING A PHOTOVOLTAIC ARRAY

(71) Applicant: FTC Solar, Inc., Austin, TX (US)

(72) Inventors: Nagendra Cherukupalli, Saratoga, CA (US); Larry Wong, San Francisco, CA (US); Milo Zabala, Concord, CA (US)

(73) Assignee: FTC Solar, Inc., Austin, TX (US)

( * ) Notice: Subject to any disclaimer, the term of this patent is extended or adjusted under 35 U.S.C. 154(b) by 24 days.

(21) Appl. No.: 18/328,929

(22) Filed: Jun. 5, 2023

(65) Prior Publication Data

US 2023/0318525 A1    Oct. 5, 2023

Related U.S. Application Data

(62) Division of application No. 16/522,090, filed on Jul. 25, 2019, now Pat. No. 11,711,048.

(60) Provisional application No. 62/727,216, filed on Sep. 5, 2018.

(51) Int. Cl.
*H02S 20/32*  (2014.01)
*H02S 20/10*  (2014.01)

(52) U.S. Cl.
CPC .............. *H02S 20/32* (2014.12); *H02S 20/10* (2014.12)

(58) Field of Classification Search
CPC ................................ H02S 20/32; H02S 20/10
See application file for complete search history.

(56) References Cited

U.S. PATENT DOCUMENTS

| | | | |
|---|---|---|---|
| 8,459,249 B2 | 6/2013 | Corio | |
| 2015/0337809 A1 | 11/2015 | Jordan | |
| 2015/0372636 A1* | 12/2015 | Menard | F24S 25/50 136/246 |
| 2017/0234580 A1* | 8/2017 | Worden | F24S 30/42 126/606 |
| 2018/0145198 A1* | 5/2018 | Saito | H01L 31/048 |
| 2018/0254740 A1* | 9/2018 | Corio | F16M 11/125 |

FOREIGN PATENT DOCUMENTS

WO    2013085776 A2    6/2013

\* cited by examiner

*Primary Examiner* — Jayne L Mershon
(74) *Attorney, Agent, or Firm* — Armstrong Teasdale LLP

(57) ABSTRACT

Tracking systems for adjusting a photovoltaic array are disclosed. In some embodiments, the tracking system includes an actuator that moves one or more links to cause the array to rotate. The tracking system may be disposed below a torque rail of the tracking system. The actuator may be a slew drive that retracts or extends the one or more links to cause the array to rotate.

10 Claims, 10 Drawing Sheets

TRACKING SYSTEMS FOR ADJUSTING A PHOTOVOLTAIC ARRAY

CROSS-REFERENCE TO RELATED APPLICATION

This application is a Divisional of U.S. Non-provisional patent application Ser. No. 16/522,090, filed Jul. 25, 2019, which claims the benefit of U.S. Provisional Patent Application No. 62/727,216, filed Sep. 5, 2018. Each application is incorporated herein by reference in its entirety.

FIELD OF THE DISCLOSURE

The field of the present disclosure relates generally to tracking systems for adjusting a photovoltaic array. In some embodiments, the tracking system includes an actuator that adjusts one or more links to cause the array to rotate.

BACKGROUND

Solar arrays are devices that convert light energy into other forms of useful energy (e.g., electricity or thermal energy). One example of a solar array is a photovoltaic array that converts sunlight into electricity. Some photovoltaic arrays are configured to follow the path of the sun to minimize the angle of incidence between incoming sunlight and the photovoltaic array.

Photovoltaic array assemblies may include a mount that supports the photovoltaic array and connects it to an anchoring structure. Conventionally, a drive positioned along a torque rail of the mount is used to rotate the array. Such arrangements involve relatively large drive gears which may shade the array or which may interfere with other parts of the assembly during tracking. Alternatively, taller rail modules may be used to provide clearance. Linear actuators may conventionally be used to rotate the array. Such linear actuators suffer from reliability issues causing the pivoting action of the array to often fail.

A need exists for tracking systems for rotating photovoltaic arrays that are characterized by a reduced profile and/or that reduce interference with other parts of the photovoltaic array assembly.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a tracking system for adjusting a photovoltaic array. The tracking system includes a torque rail for supporting the photovoltaic array. A mounting member is connected to the torque rail. The tracking system includes an actuator for adjusting the photovoltaic array. A link is connected to the actuator and is connected to the mounting member at an attachment point. The attachment point is spaced from the torque rail.

Another aspect of the present disclosure is directed to a tracking system for adjusting a solar array. The tracking system includes a drive for moving the solar array. A link holder is mounted to the drive. A first link extends from and is connected to the link holder. A second link extends from and is connected to the link holder. The first and second links enable the position of the solar array to be adjusted during operation of the drive.

A further aspect of the present disclosure is directed to a ground-mounted photovoltaic array assembly. The assembly includes a photovoltaic array, a base, and a tracking system. The tracking system includes a torque rail that defines a rotational axis about which the photovoltaic array rotates. The tracking system includes a support column that supports the photovoltaic array. The support column is connected to the base. The tracking system includes an actuator for adjusting the photovoltaic array. The actuator is disposed below the torque rail. The array assembly includes a controller to adjust the tracking system such that the photovoltaic array follows a path of the sun.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
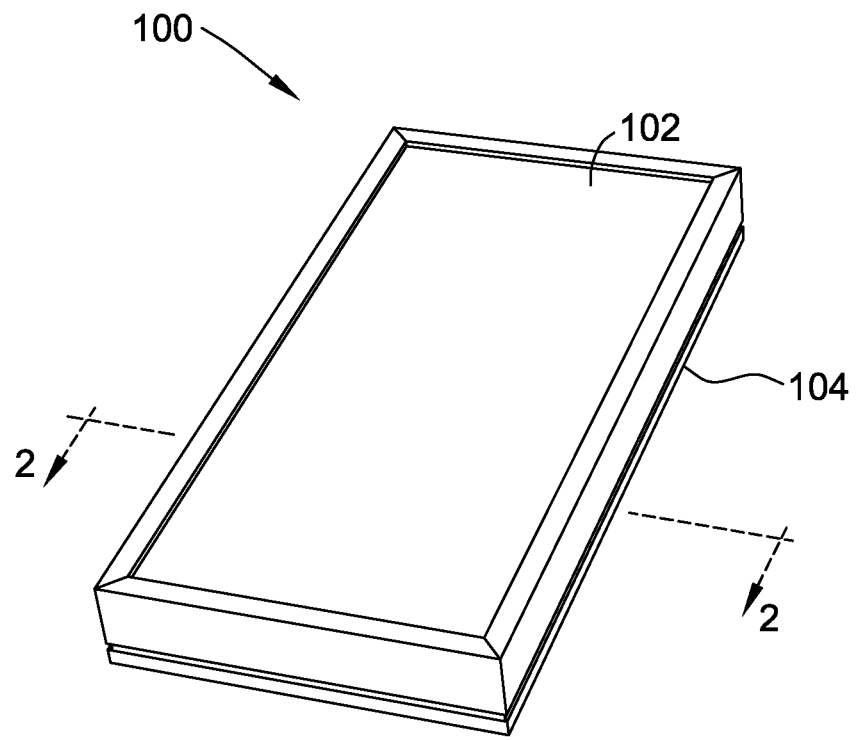
FIG. 1 is a perspective view of a solar array.
Figure 2:
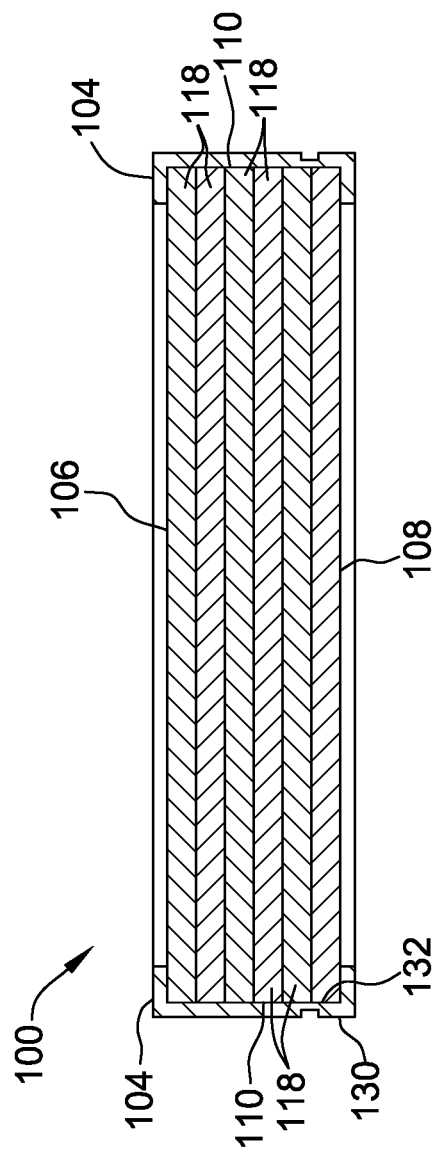
FIG. 2 is a cross-sectional view of the solar array of FIG. 1 taken along line A-A of FIG. 1.

An embodiment of a solar array 100 is shown in FIG. 1. The solar array 100 includes a solar panel 102. The solar panel 102 includes a top surface 106 and a bottom surface 108 (FIG. 2). Edges 110 extend between the top surface 106 and the bottom surface 108. Solar panel 102 is rectangular shaped. In other embodiments, solar panel 102 may have any shape that allows the solar array to function as described herein.

A frame 104 circumscribes and supports the solar panel 102. The frame 104 is coupled to the solar panel 102, for example as shown in FIG. 2. The frame 104 protects the edges 110 of the solar panel 102. The frame 104 includes an outer surface 130 spaced from the solar panel 102 and an inner surface 132 adjacent to the solar panel 102. The outer surface 130 is spaced from, and substantially parallel to, the inner surface 132. The frame 104 may be made of any suitable material providing sufficient rigidity including, for example, metal or metal alloys, plastic, fiberglass, carbon fiber and the like. In some embodiments, the frame is made of aluminum, such as 6000 series anodized aluminum.

In the illustrated embodiment, the solar array 100 is a photovoltaic array. The solar panel 102 has a laminate structure that includes a plurality of layers 118. Layers 118 include, for example, glass layers, non-reflective layers, electrical connection layers, n-type silicon layers, p-type silicon layers, backing layers and combinations thereof. In other embodiments, the solar panel 102 may have more or fewer layers 118 than shown in FIG. 2, including only one layer. The photovoltaic array 100 may include a plurality of photovoltaic modules with each module made of photovoltaic cells.

In some embodiments, the solar array is a thermal collector that heats a fluid such as water. In such embodiments, the solar panel 102 may include tubes of fluid which are heated by solar radiation. While the present disclosure may describe and show a photovoltaic array, the principles disclosed herein are also applicable to a solar array configured as a thermal collector unless stated otherwise.

Figure 3:
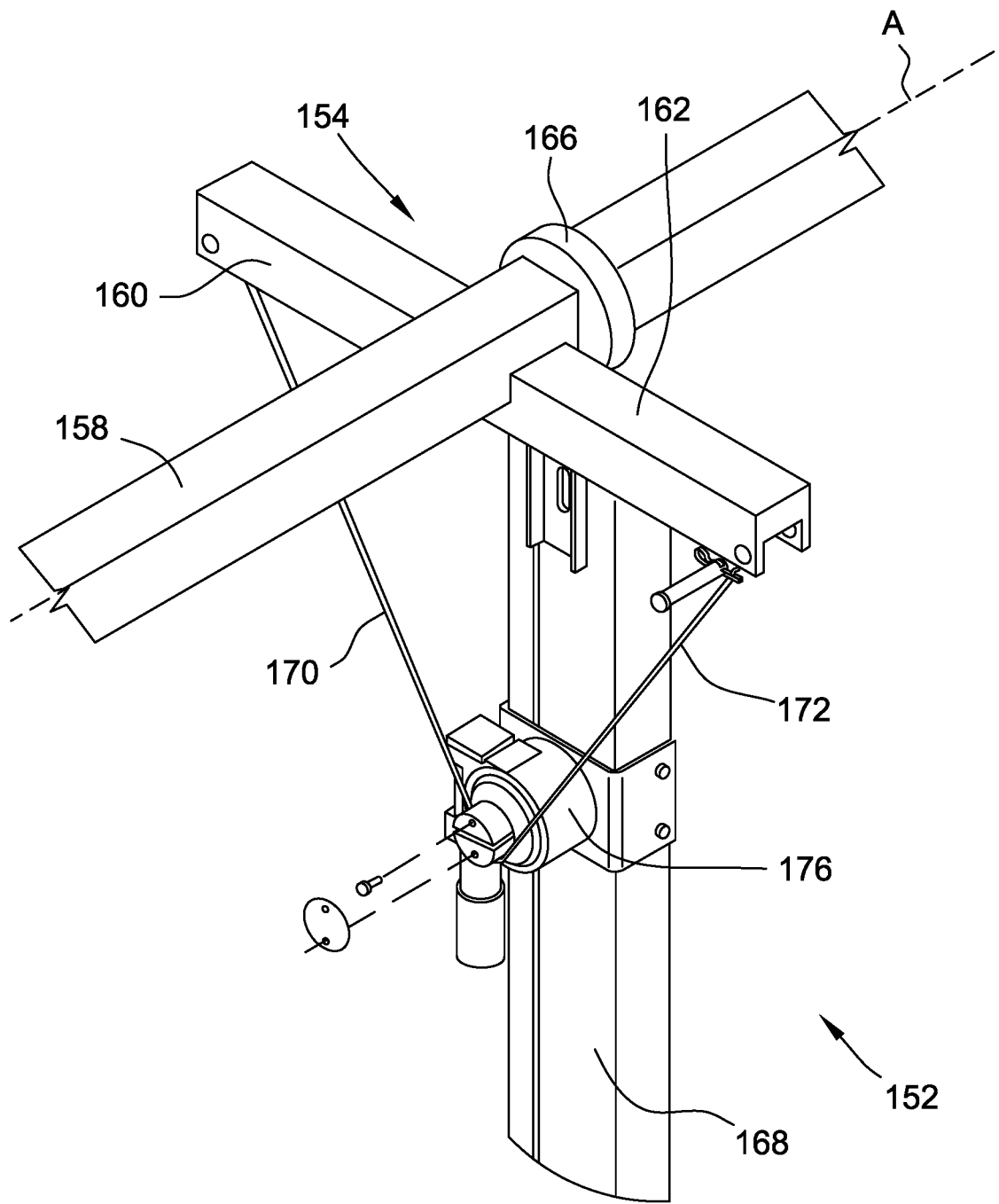
FIG. 3 is a perspective view of an embodiment of a tracking system for rotating the solar array.

FIG. 3 shows an exemplary embodiment of a tracking system 152 for adjusting the position of the solar array 100. The tracking system 152 includes a mounting frame 154 that supports the photovoltaic array 100 (FIG. 1). The mounting frame 154 includes a torque rail 158 to which the solar array 100 is connected. The solar array may be connected to the torque rail 158 by any suitable method including, for example, fasteners such as bolts and clips or by a clamping device.

In the illustrated embodiment, the torque rail 156 has a rectangular shaped cross-section. In other embodiments, the torque rail 156 has another shaped cross-section, for example, circular, triangular, polygonal and the like. The solar array pivots about a rotational axis A that extends through the torque rail 158.

A first mounting member 160 and a second mounting member 162 are connected to the torque rail 158. Generally, any mounting member which is capable of connecting to links 170, 172 at a point spaced from the torque rail 158 such that retraction and extraction of the links causes the torque rail to rotate may be used unless stated otherwise. In the illustrated embodiment, the mounting members 160, 162 are cantilevered mounting arms that extend from the torque rail 158. The mounting members 160, 162 may be separate components or an integrated single component (e.g., two sides of a rod, shaft, tube, or the like).

The first mounting member 160 extends outward from the torque rail 158 in a direction opposite that of the second mounting member 162. In the illustrated embodiments, the mounting members 160, 162 are orthogonal to the torque rail 158. In other embodiments, each mounting member 160, 162 is acutely angled with the torque rail 158 (e.g., the mounting members extend downward, upward, forward, or rearward).

Figure 8:
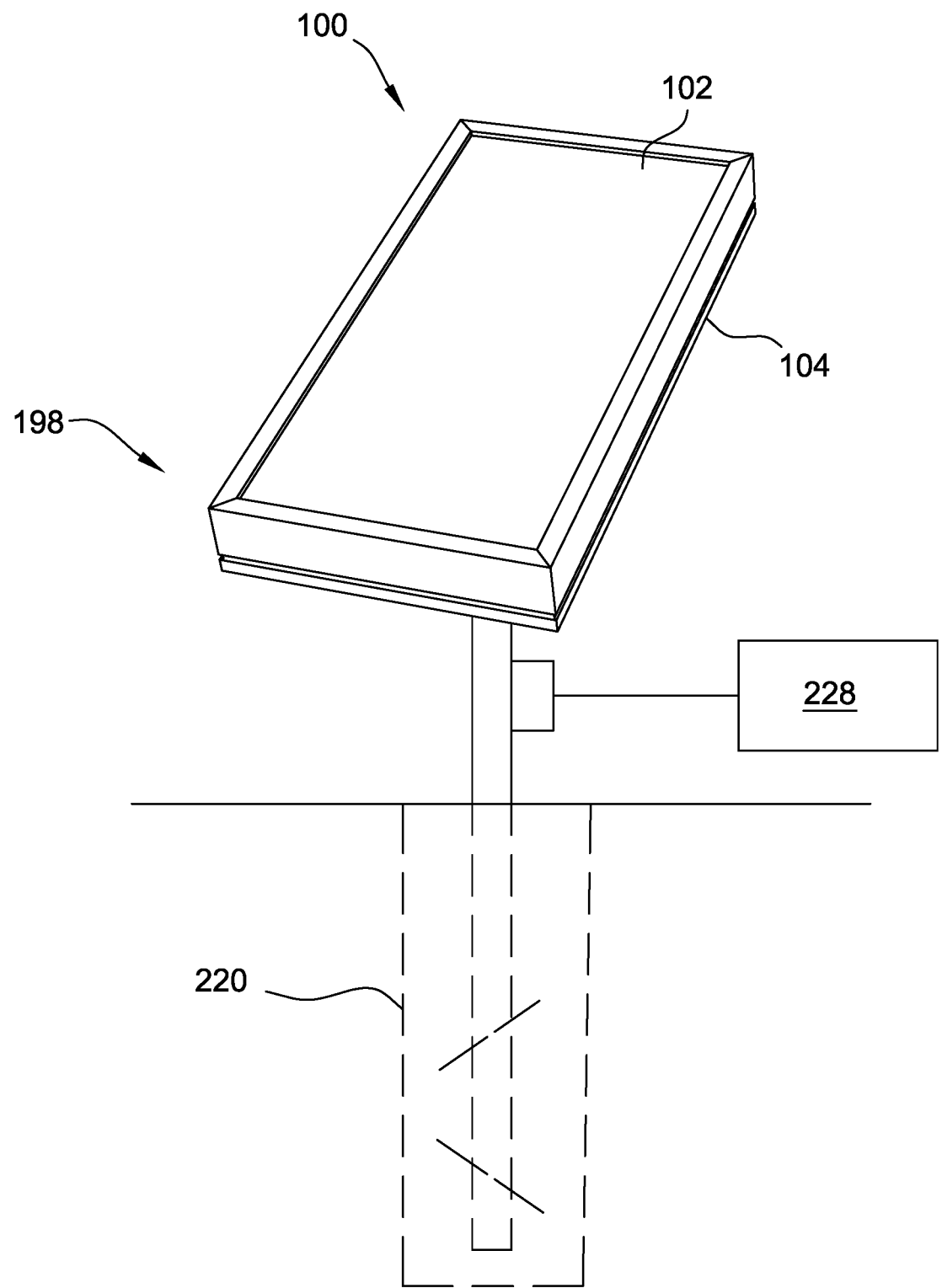
FIG. 8 is a perspective view of a solar array assembly.

The torque rail 158 is pivotally connected to a support column 168. In the illustrated embodiment, the support column 168 is an I-beam post. Other support columns may be used in other embodiments (e.g., a tubular support column). The support column 168 is connected to a base 220, shown as a foundation in the ground-mounted embodiment of FIG. 8. Generally, any base 220 that anchors the array 100 may be used such as a frame member (e.g., a horizontal rail that supports multiple arrays with one or more posts securing the rail to the ground), stanchion, ram, pier, ballast, post or the like. The base 220 may be a foundation which encases a portion of the support column 168 or may include brackets, fasteners or the like that connect to the support column 168. The photovoltaic array may be ground mounted as shown in FIG. 8 or may be connected to another structure which supports the array (e.g., roof-top applications). The base 220, tracking system 152, and array 100 may be part of a solar array assembly 198 (FIG. 8).

The torque rail 158 extends through an opening in the pivoting member 166. The pivoting member 166 may include a bushing that rotates within a housing to allow the torque rail 158 to rotate relative to the support column 168. In other embodiments, the pivoting member 166 is a roller bearing (e.g., ball bearing). The pivoting member 166 is also connected to the support column 168.

Figure 4:
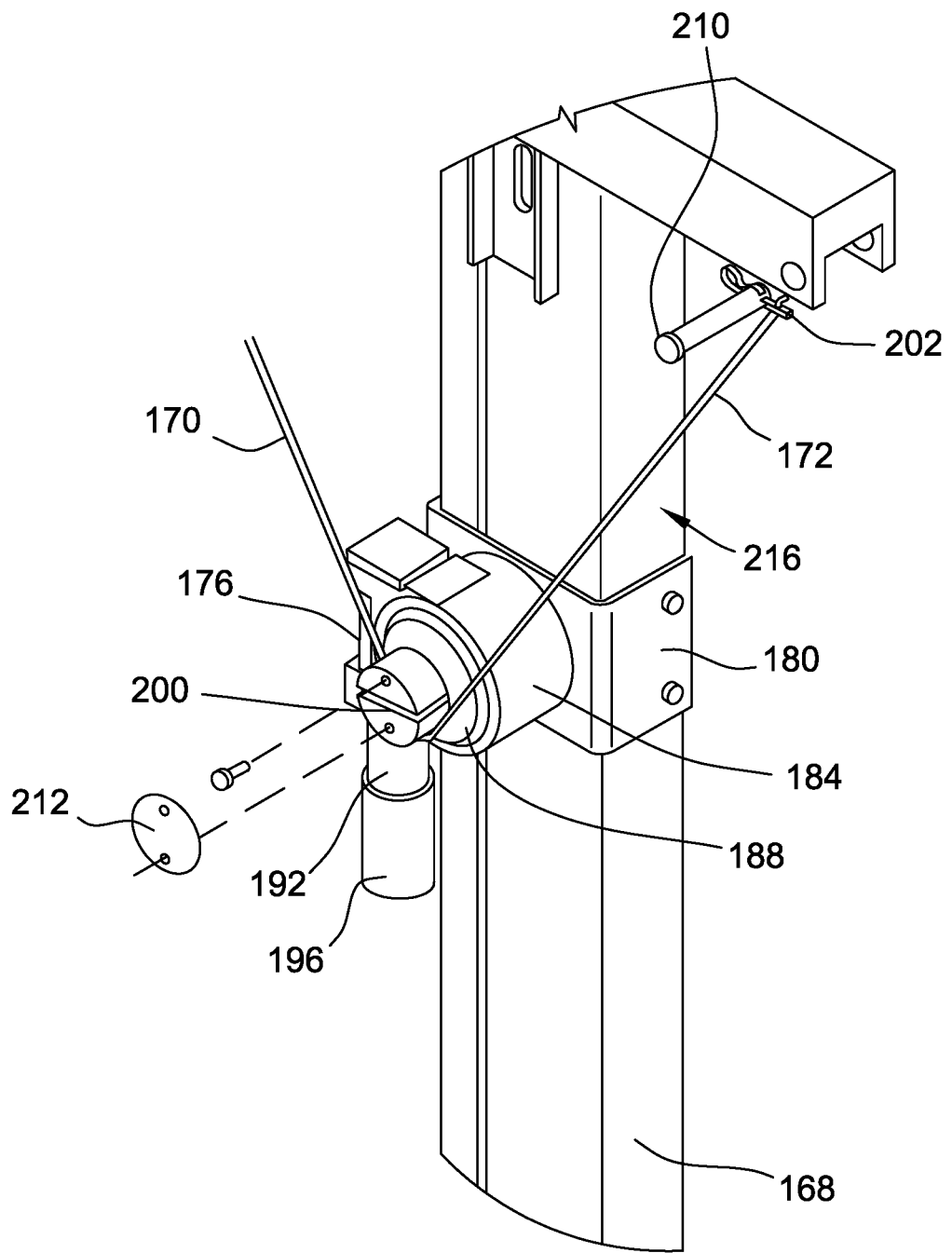
FIG. 4 is a detailed perspective view of the tracking system.

The tracking system 152 also includes an actuator 176 that adjusts the position of the photovoltaic array. The actuator 176 causes the torque rail 158 to pivot relative to the support column 168. The actuator 176 is disposed between the torque rail 158 and a base 220 (FIG. 8) to which the support column 168 is connected. In the illustrated embodiment, the actuator 176 includes a slew drive 184 (FIG. 4). The slew drive 184 includes a rotating member 188 that is driven by a shaft located within horizontal shaft housing 192. The horizontal shaft is driven by a motor 196.

A link holder 200 is connected to and rotates with the rotating member 188. A first link 170 and a second link 172 are connected to the link holder 200. In the embodiment illustrated in FIGS. 3-4, the first and second links 170, 172 are cables or wires and the link holder 200 is configured to connect to the cables or wires. The cable or wires may be connected as an integrated component 216 (e.g., single cable, wire or chain) that passes through the holder 200. In the embodiment illustrated in FIGS. 3-4, the link holder 200 includes an opening through which the cable or wire passes through. In other embodiments, the first and second links 170, 172 are separate and independently fastened to the link holder 200. The link holder 200 may include a cap 212.

The actuator 176 is connected to the support column 168 and is spaced from and below the torque rail 158. The actuator 176 may be connected to the support column 168 in any suitable manner such as by a bracket 180. In the embodiment of FIGS. 3-4, the first link 170 is connected to the first mounting member 160 (FIG. 3) at an attachment point that is spaced from the torque rail 158. The second link 172 is connected to the second mounting member 162 at an attachment point spaced from the torque rail 158. In some embodiments, the distance between each attachment point and the torque rail 158 is at least about 0.5 times the width of the torque rail or at least the width of the torque rail or at least twice the width of the torque rail. First and second crimping devices (second crimping device 202 being shown in FIG. 4) connect the first and second links 170, 172 to the first and second mounting members 160, 162. A cotter pin 210 acts as a stopper. The first and second links 170, 172 each extend upward and outward from the actuator 176 toward the first and second mounting members 160, 162.

Rotation of the rotating member 188 and the link holder 200 causes one of the first and second links 170, 172 to retract (e.g., to be pulled down toward the actuator 176) while the other link 170, 172 extends (e.g., moves upward and away from the actuator 176). In this manner, the actuator 176 pivots the mounting members 160, 162 in opposite directions (i.e., one pivoting up and the other pivoting down) causing the torque rail 158 to rotate.

Figure 5:
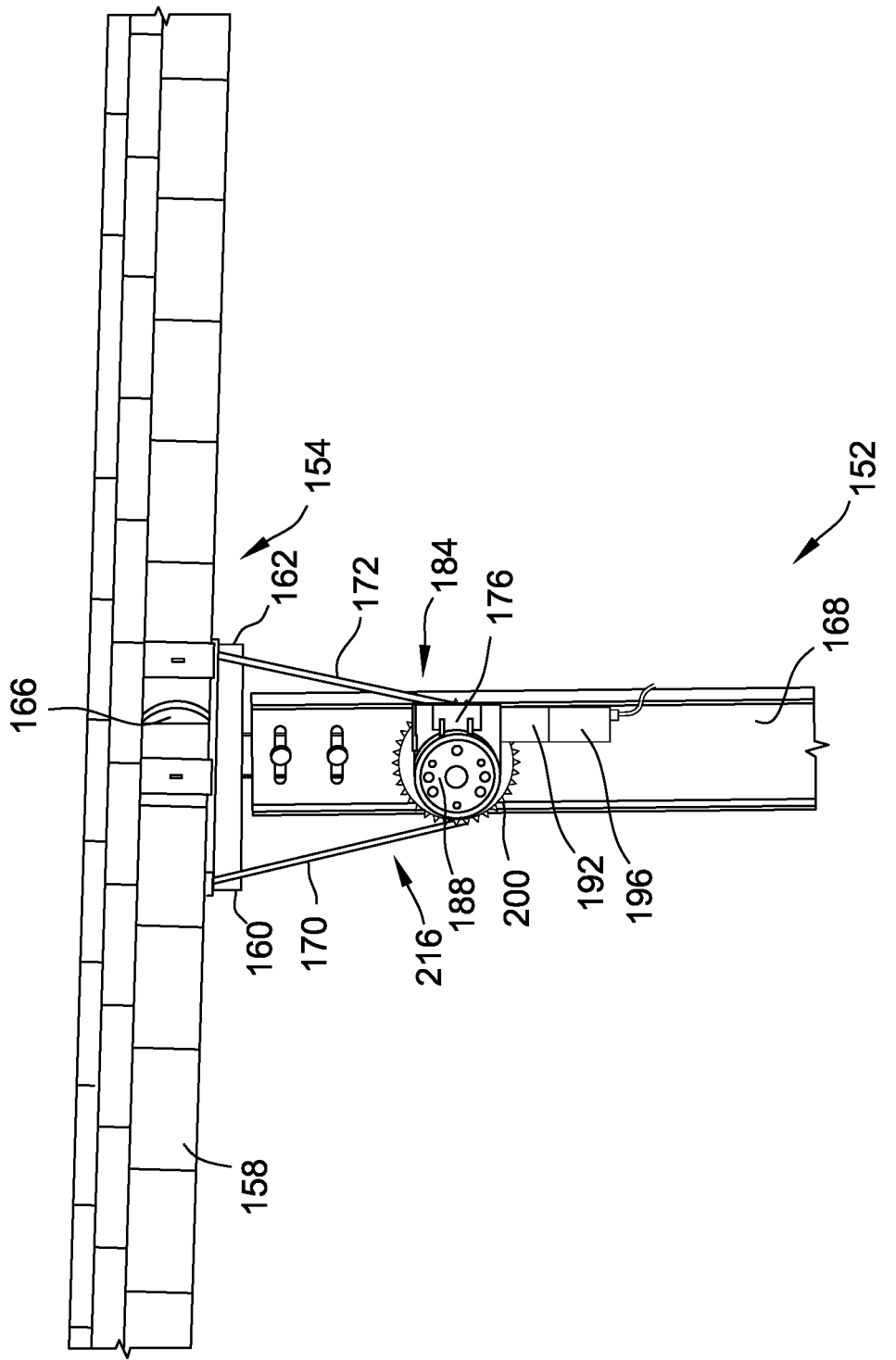
FIG. 5 is a perspective view of another embodiment of a tracking system.

Another embodiment of a tracking system 152 is shown in FIG. 5. The link holder 200 of the tracking system 152 of the embodiment of FIG. 5 is a sprocket and the first and second links 170, 172 are two sides of a chain 216. The sprocket is connected to the rotating member 188 of the slew drive 184. In the embodiment illustrated in FIG. 5, the chain 216 is connected to the first and second mounting members 160, 162 toward the respective ends of the chain. In other embodiments, the first and second mounting members 160, 162 are two sides of a second sprocket (not shown) that is connected to the torque rail 158. The chain 216 may be a continuous loop that extends around the second sprocket for rotation of the array. In some embodiments, the tracking system 152 includes a lock (not shown) that prevents rotation of the link holder (e.g., sprocket) in one or more directions (e.g., a pawl that prevents rotation in one or more directions).

Figure 6:
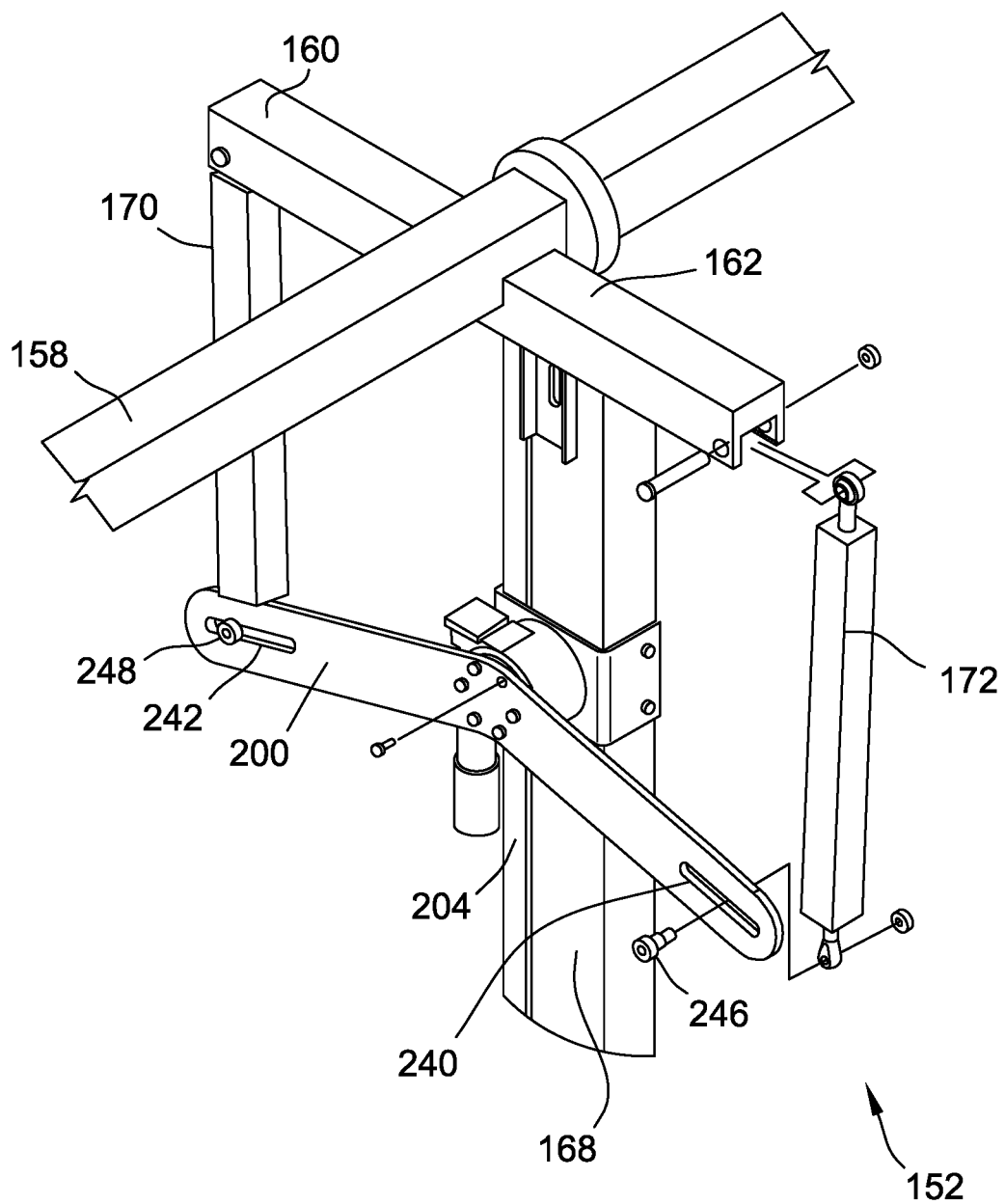
FIG. 6 is a perspective view of another embodiment of a tracking system.
Figure 7:
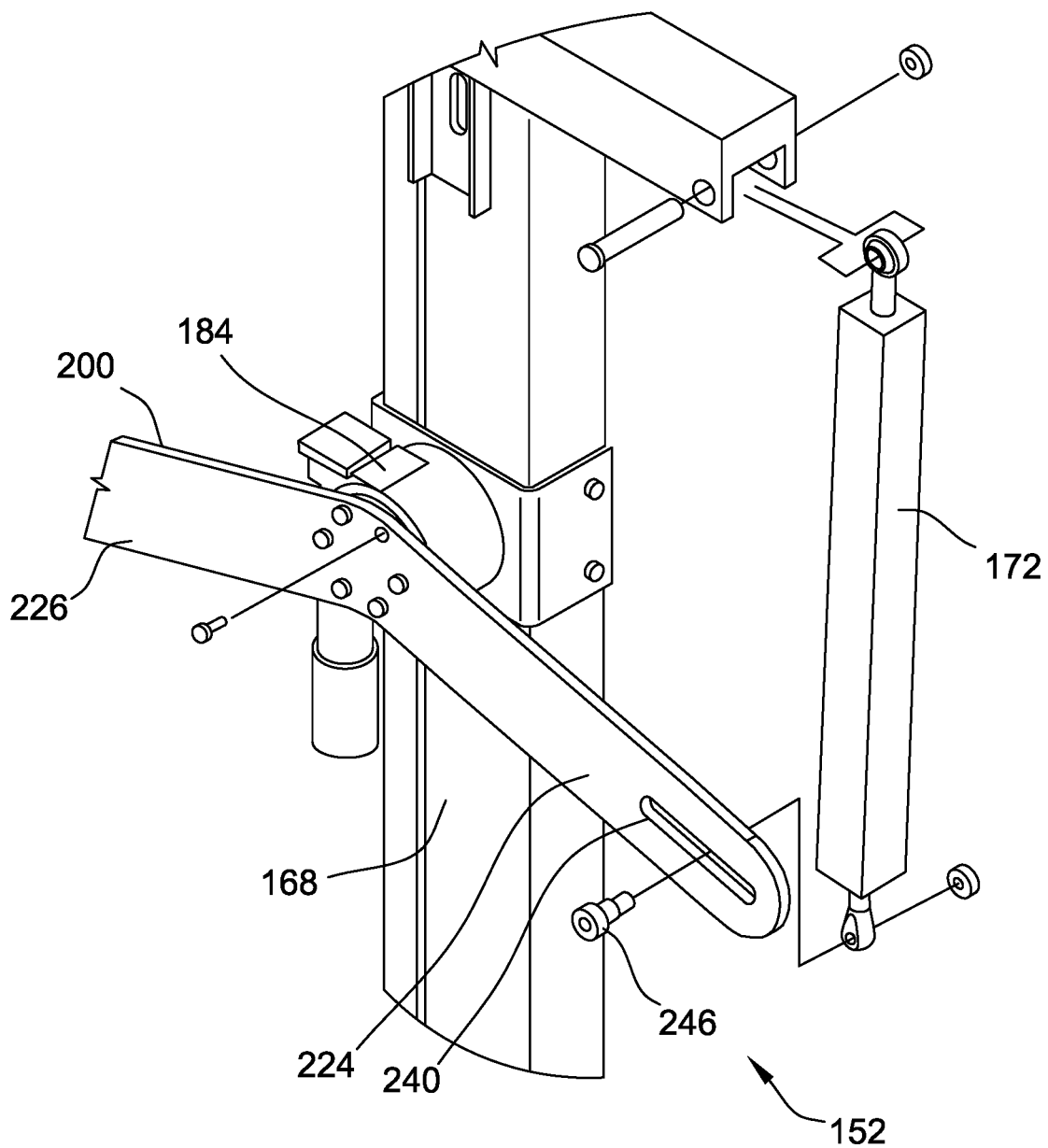
FIG. 7 is a detailed perspective view of the tracking system of FIG. 6.

Another embodiment of the tracking system 152 is shown in FIGS. 6-7. In the embodiment of FIGS. 6-7, the links 170, 172 are rocker arms. The links 170, 172 are connected to the link holder 200 and to the first and second mounting members 160, 162. In the illustrated embodiment, the link holder 200 is a rocker arm guide plate 204. The guide plate 204 is attached to the slew drive 184. The guide plate 204 has first and second arms 224, 226. The first and second arms 224, 226 of the guide plate 204 each include a slot 240, 242. Rocker arm pins 246, 248 are received in the slot. The rocker arm pins 246, 248 move within the slots 240, 242 as the guide plate 204 rotates to facilitate rotation of the guide plate 204. The first and second arms 224, 226 of the guide plate 204 may be angled relative to each other as shown or may coplanar.

In some embodiments, the tracking system 152 includes a controller 228 (FIG. 8) that is communicatively connected to the actuator 176. The controller 228 adjusts the tracking system 152 such that the photovoltaic array 100 follows the path of the sun, such as during movement of the sun over a course of a day. In some embodiments, the tracking system 152 positions the photovoltaic array 100 based on seasonal variations in the position of the sun. The photovoltaic array assembly 198 may be a single axis tracker or a dual axis tracker with the torque rail 158 defining at least one axis of rotation of the array. The other axis of rotation may be a vertical axis with rotation being achieved by a rotatable coupling and, optionally, a second actuator.

In some embodiments, the above described systems and methods are electronically or computer controlled. The embodiments described herein are not limited to any particular system controller or processor for performing the processing tasks described herein. The term "controller" or "processor", as used herein, is intended to denote any machine capable of performing the calculations, or computations, necessary to perform the tasks described herein. The terms "controller" and "processor" also are intended to denote any machine capable of accepting a structured input and of processing the input in accordance with prescribed rules to produce an output. It should also be noted that the phrase "configured to" as used herein means that the controller/processor is equipped with a combination of hardware and software for performing the tasks of embodiments of the disclosure, as will be understood by those skilled in the art. The terms "controller" and "processor", as used herein, refers to central processing units, microprocessors, microcontrollers, reduced instruction set circuits (RISC), application specific integrated circuits (ASIC), logic circuits, and any other circuit or processor capable of executing the functions described herein.

The computer implemented embodiments described herein embrace one or more computer readable media, including non-transitory computer readable storage media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Aspects of the disclosure transform a general-purpose computer into a special-purpose computing device when configured to execute the instructions described herein. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

A computer or computing device such as described herein has one or more processors or processing units, system memory, and some form of computer readable media. By way of example and not limitation, computer readable media comprise computer storage media and communication media. Computer storage media include volatile and non-volatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Figure 9:
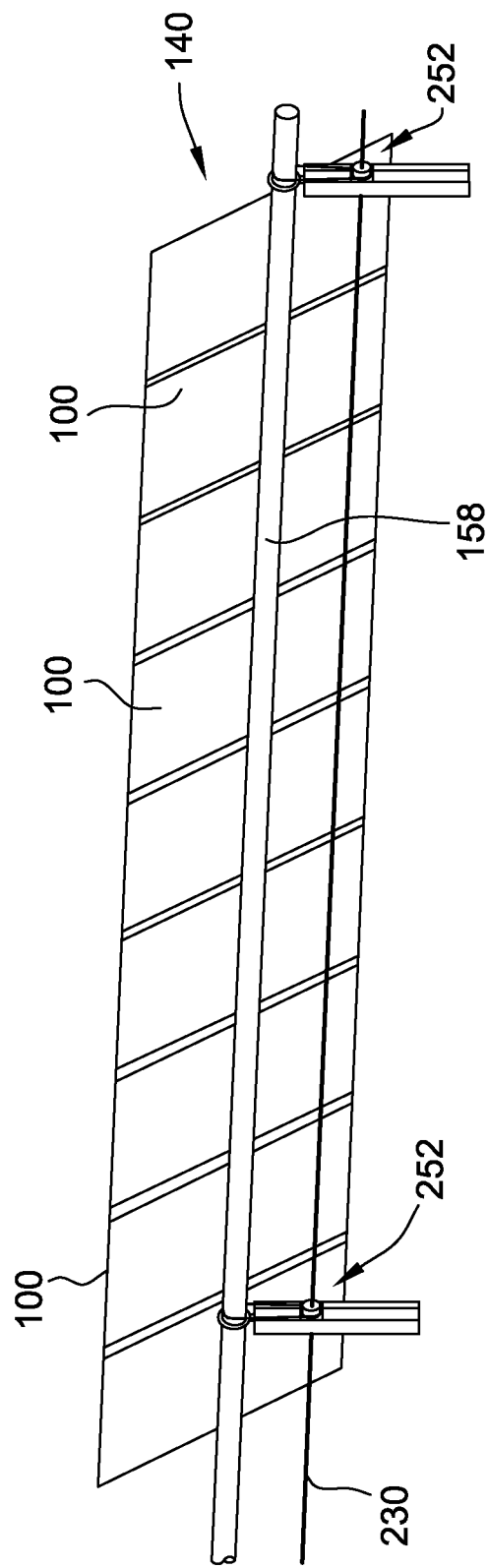
FIG. 9 is a perspective view a row of solar arrays driven by secondary drive assemblies.
Figure 10:
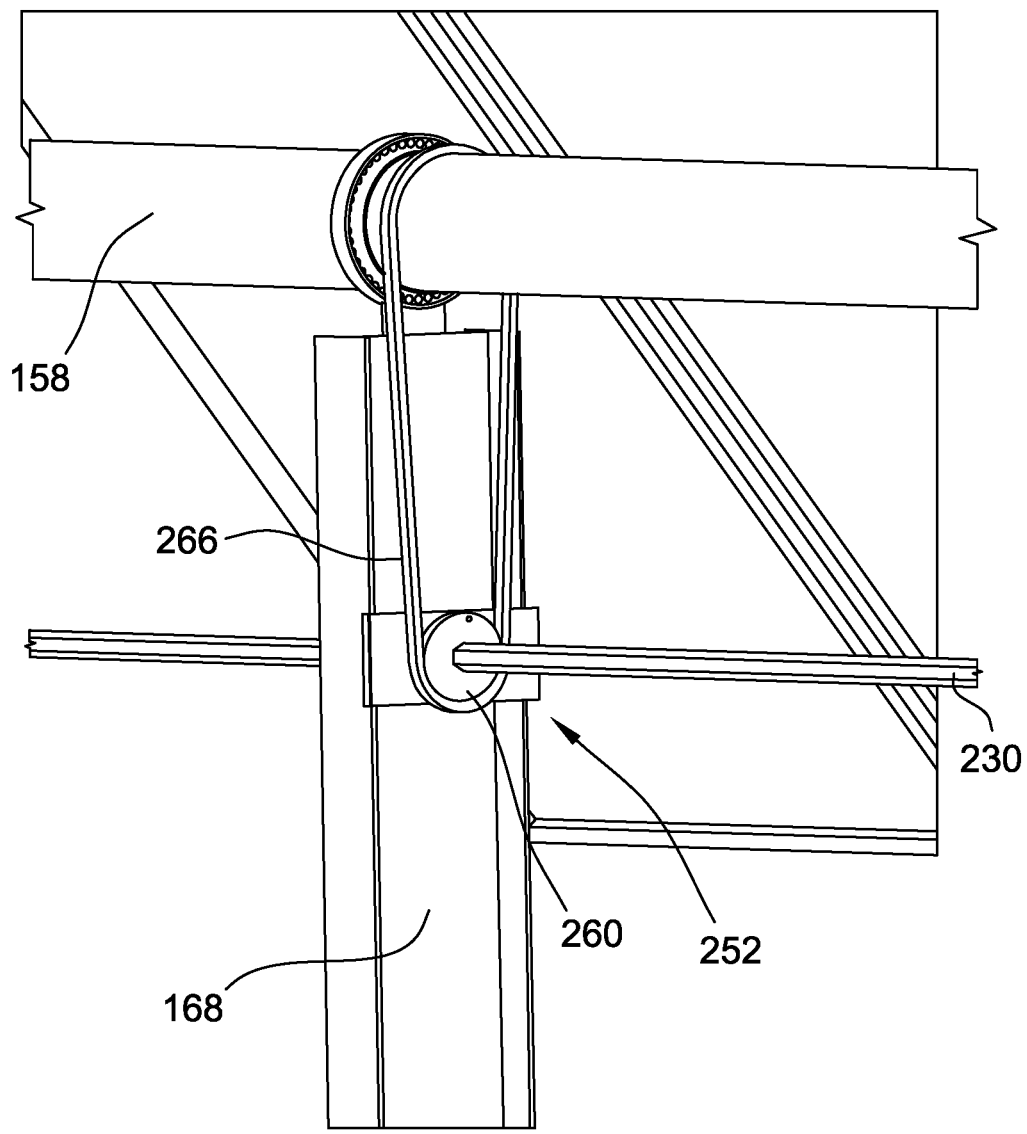
FIG. 10 is a perspective view of a secondary drive assembly.

Referring now to FIG. 9, embodiments of the tracking assembly such as the tracking system 152 of any of FIGS. 3-7 may be connected to an axle 230. The axle 230 may be connected directly to the slew drive 184 (FIGS. 3-7) or indirectly connected such as by a chain, belt or gear. The tracking system 152 and axle 230 may be used to rotate a row 140 of solar arrays 100. The axle 230 may be connected to secondary drive assemblies 252. Any secondary drive assembly that assists the primary drive assembly (i.e., the assembly driven by an actuator such as the slew drive described above) in rotating the row 140 may be used unless stated otherwise. In the embodiment illustrated in FIG. 10, the secondary drive assembly 252 includes a connection device 260 such as a sprocket, gear or pulley (shown as a pulley) connected to the axle 230. A secondary drive linkage 266 such as a chain, belt, cable or wire (shown as a belt) is looped around the connection device 260. The linkage 266 may be connected to a torque rail 158 of the row 140 (FIG. 10) of solar arrays 100 (e.g., looped around a sprocket connected to the torque rail).

In some embodiments, the tracking system 152 may be used to rotate two or more rows of solar arrays 100. For example, the two or more rows may be linked by a secondary drive having a linkage (e.g., belt, chain, cable, wire or the like) and one or more connection devices (e.g., sprocket, gear or pulley) such that operation of the actuator 176 causes the multiple rows of actuators to be rotated (such as through connection by a sprocket, pulley or other connection device).

Compared to conventional tracking systems for adjusting a photovoltaic array, the tracking systems of the present disclosure have several advantages. In embodiments in which the tracking system includes links that are actuated to rotate the array, the actuator may be positioned below the torque rail which increases clearance for the array during rotation and reduces shading. In embodiments in which a slew drive is used to move the links and rotate the solar array, the slew drive may be relatively smaller than other actuators such as gear-driven actuators (e.g., actuators directly attached to the torque rail). Use of mounting members that extend from the torque rail such as cantilevered mounting arms allows the power of the actuator to be amplified. Use of secondary drives (e.g., drives connected by a linkage such as a chain) allows an entire row of solar arrays to be rotated by a single primary drive and/or allows multiple rows of solar arrays to be rotated by the primary drive, thereby reducing cost of the tracking system. Use of a single drive to move a row of solar arrays or to move multiple rows of solar arrays reduces cost of the tracking system. Control of multiple rows of solar arrays by use of linkages between rows (e.g., chains, belts, cables or the like) allows rows on variable terrain to be controlled (i.e., the primary drive assembly can be at a height different from the other rows).

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A ground-mounted photovoltaic array assembly comprising:
   a photovoltaic array;
   a base;
   a tracking system comprising:
      a torque rail that defines a rotational axis about which the photovoltaic array rotates;
      a support column that supports the photovoltaic array, the support column being connected to the base;
      an actuator for adjusting the photovoltaic array, the actuator being disposed below the torque rail;
      a first mounting member and a second mounting member each connected to the torque rail;
      a first link connected to the actuator and connected to the first mounting member at a first attachment point, the first attachment point being spaced from the torque rail; and
      a second link connected to the actuator and connected to the second mounting member at a second attachment point, the second attachment point being spaced from the torque rail, wherein the first link and second link are connected in a single unit; and
   a controller to adjust the tracking system such that the photovoltaic array follows a path of the sun.

2. The photovoltaic array assembly as set forth in claim 1 wherein the photovoltaic array is part of a row of photovoltaic arrays, the actuator being part of a primary drive assembly, the photovoltaic assembly further comprising a secondary drive assembly for moving the row of photovoltaic arrays, the actuator being configured to move the secondary drive assembly for rotation of the row.

3. The photovoltaic array assembly as set forth in claim 1 wherein the photovoltaic array is part of a first row of photovoltaic arrays, the actuator being part of a primary drive assembly, the photovoltaic assembly further comprising a secondary drive assembly for moving a second row of photovoltaic arrays, the actuator being configured to move the secondary drive assembly for rotation of the second row.

4. The photovoltaic array assembly as set forth in claim 1 wherein the unit is a chain.

5. The photovoltaic array assembly as set forth in claim 1 wherein the unit is a cable or wire.

6. The photovoltaic array assembly as set forth in claim 1 wherein the first mounting member includes a first cantilevered mounting arm and wherein the second mounting member includes a second cantilevered mounting arm.

7. The photovoltaic array assembly as set forth in claim 1 wherein the actuator is directly mounted to the support column.

8. The photovoltaic array assembly as set forth in claim 1 wherein the tracking system further comprises a pivoting member that enables the torque rail to rotate about the rotational axis.

9. The photovoltaic array assembly as set forth in claim 1 wherein the tracking system comprises a link holder, the first link and the second link each being connected to the link holder.

10. The photovoltaic array assembly as set forth in claim 1 wherein the first mounting member and the second mounting member are connected in a single unit.

* * * * *